United States Patent
Inoue et al.

(10) Patent No.: US 8,460,408 B2
(45) Date of Patent: Jun. 11, 2013

(54) HYDROGEN SUPPLY EQUIPMENT

(75) Inventors: Dai Inoue, Ibaraki (JP); Takaaki Nagao, Ibaraki (JP); Hiroyuki Koide, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 479 days.

(21) Appl. No.: 12/504,435

(22) Filed: Jul. 16, 2009

(65) Prior Publication Data

US 2010/0015038 A1   Jan. 21, 2010

(30) Foreign Application Priority Data

Jul. 18, 2008   (JP) .................................. 2008-187753

(51) Int. Cl.
*B01J 7/00*   (2006.01)

(52) U.S. Cl.
USPC ............................... 48/61; 422/129; 422/211

(58) Field of Classification Search
USPC .......... 423/649; 48/61–90; 422/129, 211–223
See application file for complete search history.

(56) References Cited

U.S. PATENT DOCUMENTS

| 3,304,728 A | 2/1967 | De Haan |
| 2004/0040316 A1 | 3/2004 | Bradley et al. |
| 2009/0199574 A1 | 8/2009 | Hirose et al. |

FOREIGN PATENT DOCUMENTS

| CN | 101253361 A | 8/2008 |
| DE | 10 2004 035319 A1 | 2/2006 |
| JP | 56-076800 A | 6/1981 |
| WO | 2007/026880 A1 | 3/2007 |

OTHER PUBLICATIONS

European Search Report dated Feb. 21, 2011, in a counterpart European patent application No. 09165725.4.
Chinese Office Action dated May 25, 2012, in a counterpart Chinese patent application No. 200910165032.6.

*Primary Examiner* — Wayne Langel (57) ABSTRACT

Provided is hydrogen supply equipment that, when switching hydrogen supplied to equipment using hydrogen from (i) hydrogen produced at a normal temperature or hydrogen stored at a normal temperature to (ii) hydrogen stored at a low temperature, supplies the equipment using hydrogen with normal hydrogen obtained by returning the hydrogen at the low temperature to a normal temperature and then passing this hydrogen through equipment for accelerating a conversion from parahydrogen to orthohydrogen.

10 Claims, 8 Drawing Sheets

HYDROGEN SUPPLY EQUIPMENT

CROSS REFERENCE TO RELATED APPLICATION

The present application claims priority from a Japanese Patent Application No. 2008-187753 filed on Jul. 18, 2008, the contents of which are incorporated herein by reference.

BACKGROUND

1. Technical Field

The present invention relates to hydrogen supply equipment that returns hydrogen stored as a liquid to a normal temperature, and supplies the hydrogen at a normal temperature to equipment that uses hydrogen at a normal temperature.

2. Related Art

Currently used hydrogen supply equipment stores liquid hydrogen in a low-temperature storage chamber, heats and vaporizes the liquid hydrogen, and supplies the resulting gas to a device connected at a later stage. For example, when manufacturing quartz glass with a high degree of purity, techniques such as VAD or OVD may be used. Both of these techniques involve (i) generating $SiO_2$ through a hydrolysis reaction in a flame achieved by supplying a silicide such as $SiCl_4$ to an oxyhydrogen flame fueled by supplying hydrogen and oxygen to a burner, (ii) depositing the silicon dioxide to form a porous base material, and (iii) heating the porous base material in an electric furnace to form transparent quartz glass with a high degree of purity.

The hydrogen used here is produced at a normal temperature or stored at a normal temperature. One idea involves liquid hydrogen as backup hydrogen when the supply of the above hydrogen is stopped. Another option involves setting all of the hydrogen supplies to be hydrogen obtained by vaporizing liquid hydrogen. In manufacturing equipment using the VAD or OVD techniques, the flow rate of the gas supplied to the burners is controlled by a mass flow controller (MFC).

In equipment using hydrogen produced at a normal temperature, when switching to hydrogen obtained by vaporizing liquid hydrogen due to a stoppage of the hydrogen supply, a change of about 1% was seen in the actual flow rate of the hydrogen. Furthermore, even when vaporized liquid hydrogen was already being used, the actual flow rate of the hydrogen changed when the amount of hydrogen changed. In particular, when manufacturing quartz glass for optical fiber, this change in the actual flow rate of the hydrogen causes a change in the flame temperature, which affects the hydrolysis reaction of the $SiCl_4$ or the like, and also causes a change in the lifting speed of the base material, which affects the diameter of the base material. These effects lead to an increase in the rate of defective devices.

SUMMARY

Therefore, it is an object of an aspect of the innovations herein to provide hydrogen supply equipment, which is capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary piece of hydrogen supply equipment may include hydrogen supply equipment that, when switching hydrogen supplied to equipment using hydrogen from (i) hydrogen produced at a normal temperature or hydrogen stored at a normal temperature to (ii) hydrogen stored at a low temperature, supplies the equipment using hydrogen with normal hydrogen obtained by returning the hydrogen at the low temperature to a normal temperature and then passing this hydrogen through equipment for accelerating a conversion from parahydrogen to orthohydrogen.

According to a second aspect related to the innovations herein, one exemplary hydrogen supply method may include a method for supplying hydrogen, comprising returning hydrogen at a low temperature to a normal temperature; passing the hydrogen through equipment that accelerates a conversion from parahydrogen to orthohydrogen to obtain normal hydrogen; and supplying the normal hydrogen to equipment that uses hydrogen.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

When a supply to equipment using hydrogen produced at room temperature is switched to hydrogen obtained by vaporizing liquid hydrogen, a change of about 1% is seen in the flow rate. However, when supplying an MFC, the pressure and temperature of the hydrogen is held to be about the same before and after the switching of the hydrogen, and no difference is seen connecting such a change in the flow rate to the purity or impurity concentration of the liquid hydrogen and the hydrogen produced at a normal temperature.

Figure 1:
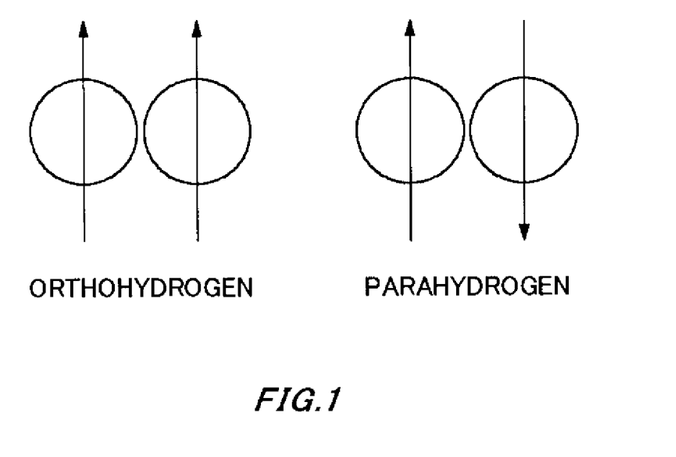
FIG. 1 is a schematic view showing the spin states of orthohydrogen and parahydrogen.

Therefore, the inventors focus on the presence of hydrogen molecule isomers. As shown schematically in FIG. 1, there are two types of hydrogen molecule isomers having different nuclear spin. Diatomic molecules such as hydrogen molecules have two protons. Hydrogen molecules in which these two protons have the same spin orientation are known as orthohydrogen, and hydrogen molecules in which these two protons have different spin orientation are known as parahydrogen.

Figure 2:
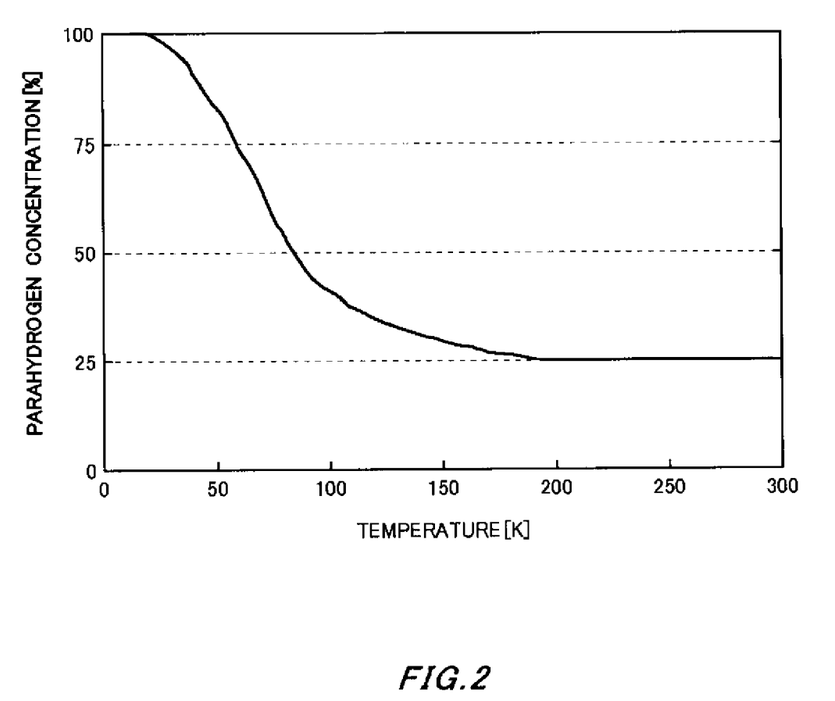
FIG. 2 shows the parahydrogen concentration in equilibrium at each temperature. The vertical axis is the parahydrogen concentration (%) and the horizontal axis is the temperature (K).

FIG. 2 shows parahydrogen concentration in equilibrium at each temperature. In equilibrium at temperatures above 200 K, the hydrogen includes orthohydrogen and parahydrogen at a ratio of 3 to 1, but in equilibrium near the boiling point of liquid hydrogen, which is 20 K, almost all of the hydrogen is parahydrogen. Hydrogen in which orthohydrogen and parahydrogen are in equilibrium at a normal temperature is referred to as normal hydrogen. The change from orthohydrogen to parahydrogen occurs gradually, and since this change is a thermal reaction, when the hydrogen at a normal temperature is used as the liquid hydrogen without changing the ratio between the orthohydrogen and the parahydrogen, the conversion from orthohydrogen to parahydrogen occurs in the low-temperature storage chamber and generates heat, so that a large amount of liquid hydrogen evaporates.

Usually, in order to prevent such a reaction and store the liquid hydrogen safely, a process of liquefying the hydrogen is used for the ortho-para conversion, such that almost all of the hydrogen becomes liquid parahydrogen, which can then be supplied or stored. Orthohydrogen and parahydrogen have different properties. The isobaric specific heat at 0 degrees Celsius is 30.35 [J/(mol·K)] for parahydrogen and 28.59 [J/(mol·K)] for normal hydrogen, which is a difference of about 6%.

On the other hand, an MFC used to control the flow rate of the hydrogen performs this control by measuring the heat capacity of the liquid passing therethrough, and therefore can accurately control the flow rate by using a different conversion factor for liquids having different specific heat. As a result, when an MFC using a thermal coefficient suitable for normal hydrogen controls the flow rate of hydrogen in which the concentration of parahydrogen is higher than that of normal hydrogen, it was found that the actual flow rate is between 0% and 6% less than normal hydrogen, according to the concentration of parahydrogen. For example, when the parahydrogen concentration was about 37%, the actual hydrogen flow rate was seen to be about 1% less than the flow rate of normal hydrogen.

If vaporized hydrogen is always being used, a change in the amount used causes a change in the time from when the hydrogen is vaporized to when the vaporized hydrogen arrives at the MFC, resulting in a change in the actual flow amount of the hydrogen. In the hydrogen obtained by vaporizing liquid hydrogen, a certain amount of the parahydrogen can be converted to orthohydrogen by contact with magnetic particles on an inner surface of a metallic tube, while waiting for this hydrogen to be supplied to equipment at later stages using hydrogen. However, by passing through a tube that is several hundred meters long, the resulting hydrogen will have a parahydrogen concentration higher than that of normal hydrogen.

Therefore, in order to prevent the change in the actual flow rate of the MFC caused by the concentration ratio between parahydrogen and orthohydrogen, the present invention provides hydrogen in a normal state to the equipment using hydrogen. More specifically, after vaporizing almost all of the liquid hydrogen in a parahydrogen state, the conversion from parahydrogen to orthohydrogen proceeds through a catalyst chamber to be supplied to the equipment using hydrogen as normal hydrogen in which the ratio of orthohydrogen to parahydrogen is 3 to 1. As a result, regardless of whether hydrogen produced at a normal temperature of hydrogen obtained by vaporizing liquid hydrogen is used, the hydrogen used will always have the same specific heat, so that the actual flow rate of hydrogen controlled by the MFC can be held constant.

The ortho-para conversion can be accelerated by using a catalyst. An effective catalyst should have a large surface area and have a catalytic effect for the para-ortho conversion. Examples of such a catalyst include activated carbon and sintered metal.

Figure 3:
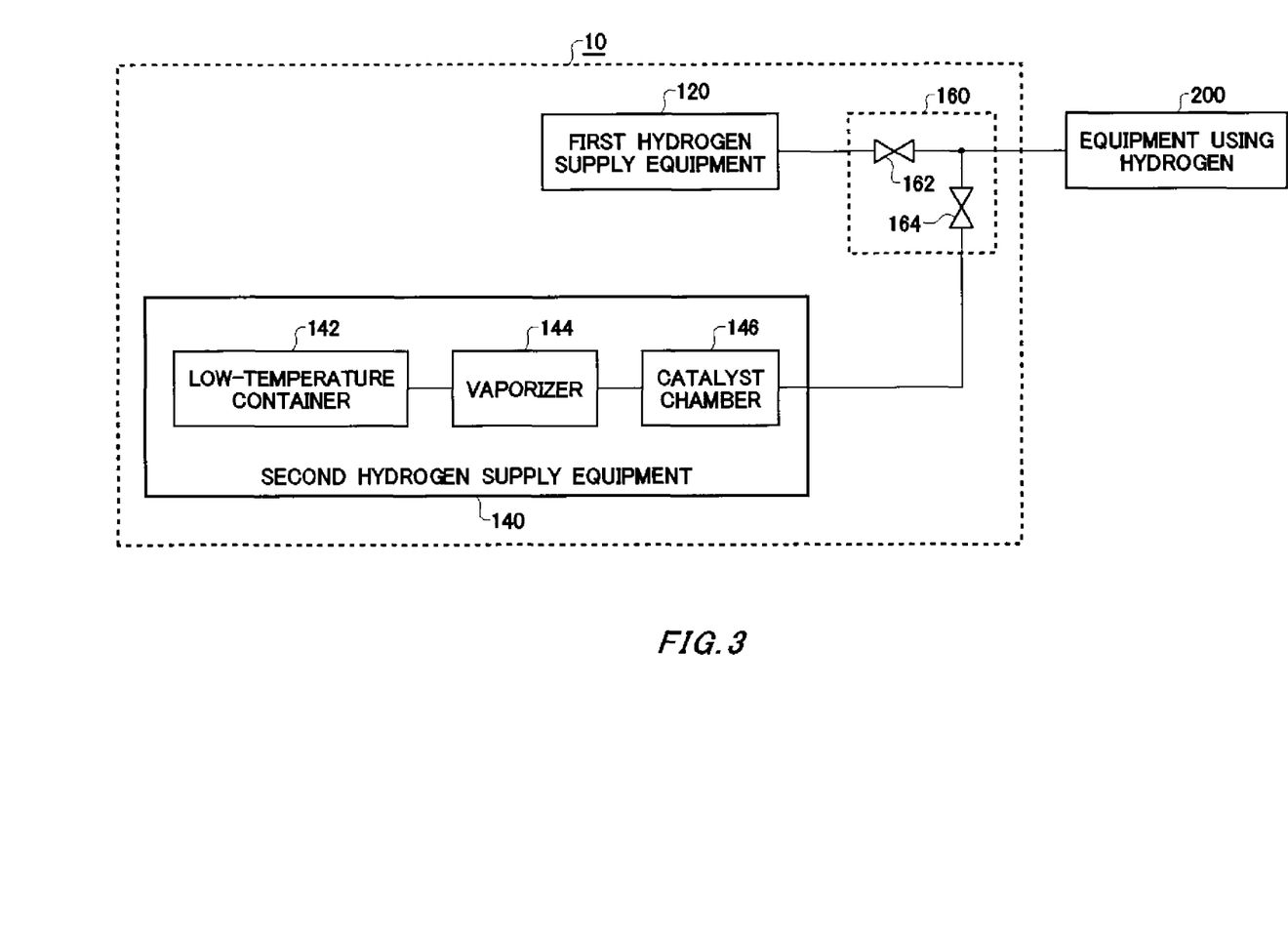
FIG. 3 shows an exemplary configuration of the hydrogen supply equipment according to an embodiment of the present invention.

FIG. 3 shows an exemplary configuration of the hydrogen supply equipment according to the present invention. The hydrogen supply equipment 10 is provided with a first hydrogen supply section 120, a second hydrogen supply section 140, and a hydrogen supply source switcher 160. The first hydrogen supply section 120 supplies hydrogen produced at a normal temperature or hydrogen stored at a normal temperature. The second hydrogen supply section 140 supplies hydrogen obtained by vaporizing liquid hydrogen. The second hydrogen supply section 140 includes a liquid hydrogen container 142, a vaporizer 144 that vaporizes the liquid hydrogen, and a catalyst chamber 146 serving as the equipment for accelerating the conversion from parahydrogen to orthohydrogen. The second hydrogen supply section 140 supplies normal hydrogen obtained by passing the hydrogen vaporized by the vaporizer 144 through the catalyst chamber 146. The hydrogen supply source switcher 160 switches which of the first hydrogen supply section 120 and the second hydrogen supply section 140 supply the hydrogen. The hydrogen supply source switcher 160 may be provided with a first valve 162 disposed in the hydrogen supply line from the first hydrogen supply section 120 and a second valve 164 disposed in the hydrogen supply line from the second hydrogen supply section 140.

The present invention is hydrogen supply equipment that can effectively supply vaporized liquid hydrogen as backup hydrogen to equipment that uses hydrogen produced in advance at a normal temperature. The following describes specific embodiments of the inventions as examples, but the present invention is not limited to these embodiments.

First Embodiment

Figure 4:
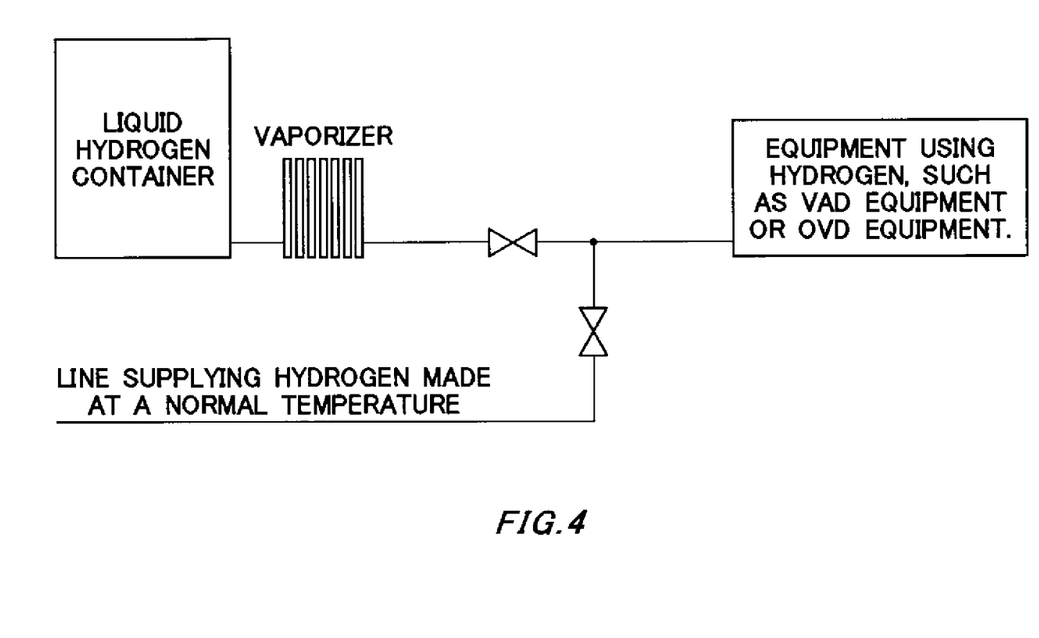
FIG. 4 is a schematic view showing the equipment using hydrogen used in an embodiment of the present invention.

As shown schematically in FIG. 4, the liquid hydrogen that was developed and provided for commercial use was stored in a liquid hydrogen container. The catalyst chamber was connected behind the hydrogen supply equipment that vaporizes the liquid hydrogen using a vaporizer and emits hydrogen gas. Equipment that uses hydrogen is connected beyond the catalyst chamber via a pipe that supplies hydrogen produced at a normal temperature merged with the hydrogen gas. The pipe of the liquid hydrogen supply line and the pipe of line supplying hydrogen produced at a normal temperature are each provided with a valve immediately before the point where the pipes merge, so that each line can be used independently.

The equipment using hydrogen may be equipment for manufacturing a soot deposition body using VAD or OVD techniques, and this equipment is connected to a hydrogen gas supply line along with a plurality of glass lathes for processing the quartz glass. The VAD technique is used to form the core of the optical fiber preform and a portion of the cladding, and the OVD technique is used to form the remaining cladding. In the present embodiment, the equipment using hydrogen is a VAD apparatus in which a change in the flow rate of the hydrogen gas affects the optical characteristics of the resulting preform. The optical fiber preform needs to have a stable refractive index distribution along the length thereof. A change in the refractive index distribution causes a change in the characteristics of the optical fiber, which in turn has a significant affect on the transmitted optical signal, and therefore such a change must be avoided.

Figure 5:
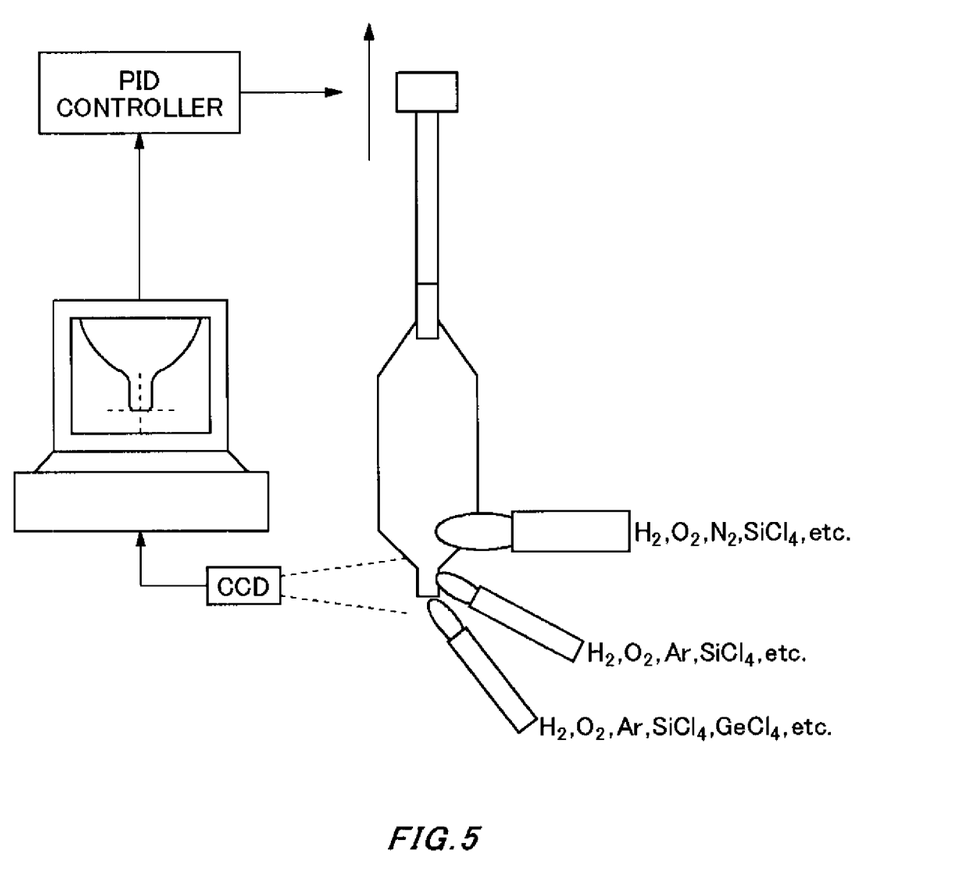
FIG. 5 is a schematic view showing the method for manufacturing an optical fiber base material using the VAD technique.

FIG. 5 is a schematic view of the VAD apparatus as an embodiment of the present invention. The VAD apparatus includes a core deposition burner, and a clad deposition burner positioned thereabove. These burners were each supplied with hydrogen, oxygen, non-volatile gas, and vaporized $SiCl_4$ as the raw material, all of which have a flow rate controlled by an MFC. The supply of hydrogen to the VAD apparatus was set to be hydrogen produced at a normal temperature by closing the valve in the liquid hydrogen supply line. The $SiCl_4$ supplied to the oxyhydrogen flame changed to $SiO_2$ due to the hydrolysis reaction, and the $SiO_2$ was sequentially deposited on the tip of a target being lifted and rotated to form a soot deposition body. During deposition, the tip of the soot deposition body was observed by a camera (CCD), and a PID controller adjusted the lifting speed according to the length of the soot deposit body to prevent the tip position from rising or falling.

Figure 6:
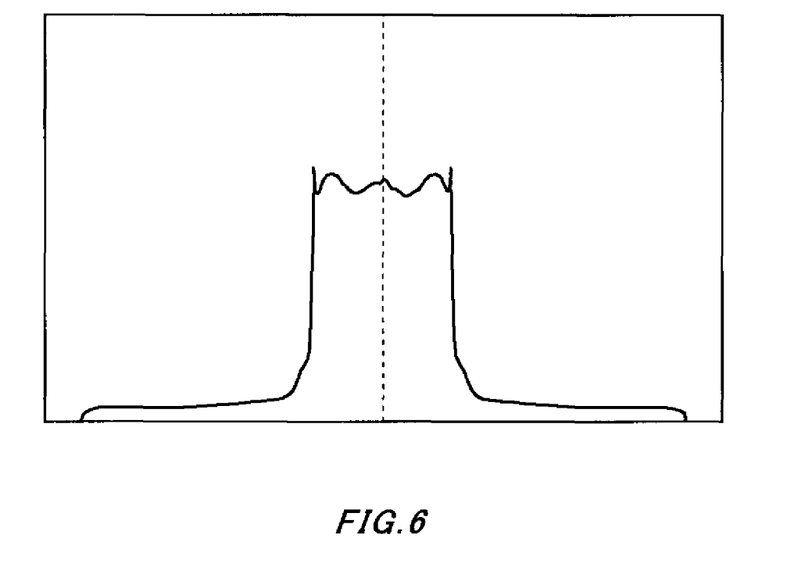
FIG. 6 is a schematic view showing the refractive index distribution of an optical base material manufactured using the VAD technique. The vertical axis represents the relative refractive index difference, and the horizontal axis represents a radial position on the preform.

In addition to $SiCl_4$, the bottom core deposition burner was supplied with $GeCl_4$. The $GeCl_4$ changed to $GeO_2$ due to the flame hydrolysis, and this $GeO_2$ was added to the resulting manufactured quartz glass to increase the refractive index. By supplying the $GeCl_4$ only to the core deposition burner, only the refractive index of the core portion increases. This results in an optical fiber preform having a refractive index distribution that is useful for optical fiber, as shown in FIG. 6. In FIG. 6, the vertical axis represents the relative refractive index difference, and the horizontal axis represents a radial position on the preform.

Figure 7A:
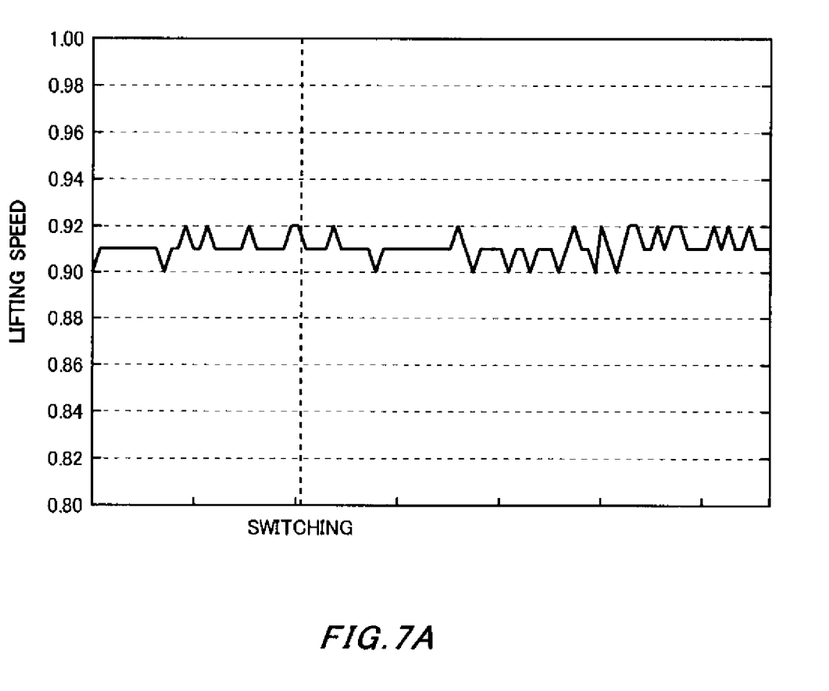
FIG. 7A shows a change in the lifting speed when the hydrogen supplied to the optical fiber base material manufacturing apparatus using the VAD technique, according to an embodiment of the present invention, is switched from normal hydrogen to hydrogen obtained by vaporizing liquid hydrogen. The vertical axis represents the lifting speed (mm/min) of the soot deposit body, and the horizontal axis represents time from left to right, where each partition is approximately 2.4 seconds.
Figure 7B:
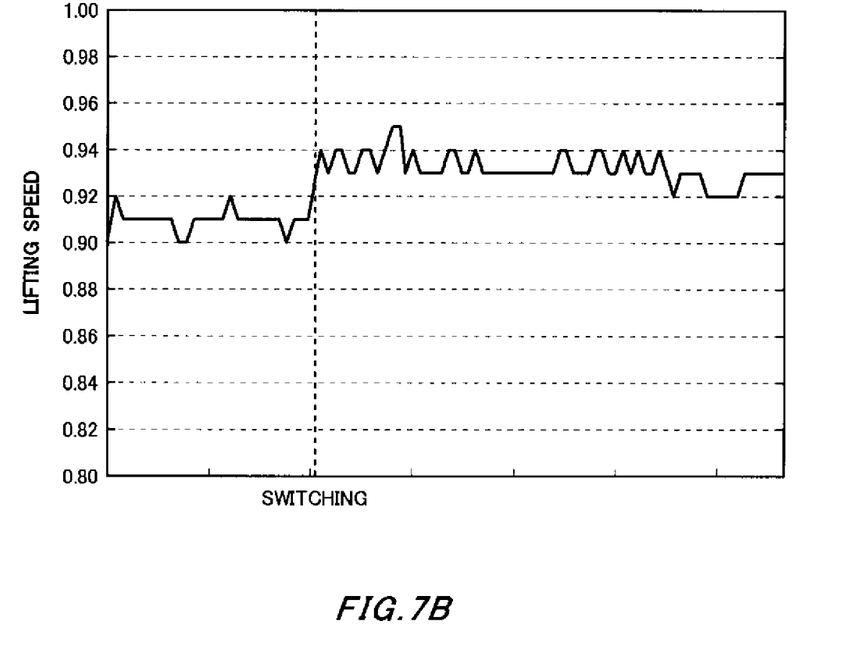
FIG. 7B shows a change in the lifting speed of a comparative example.

When a certain amount of the deposition had been completed, sintered metal was set in the catalyst chamber and heated. The heating is not absolutely necessary, but is desirably performed to accelerate the conversion reaction. In this state, the valve in the liquid hydrogen supply line was opened and the valve in the line supplying the hydrogen produced at a normal temperature was closed. As a result, the supplied hydrogen switched to normal hydrogen obtained by vaporizing liquid hydrogen, returning the vaporized hydrogen to a normal temperature, and passing this hydrogen through the catalyst chamber. In each VAD apparatus, at the time of switching, the actual flow rate of hydrogen is the same before and after the switching and, as shown in FIG. 7A, no abnormalities are seen in the lifting speed before and after the switching. Therefore, the optical fiber preform formed by changing the resulting soot deposit body into transparent glass has stable optical characteristics in a longitudinal direction. In FIGS. 7A and 7B, the vertical axes represent the lifting speed (mm/min) of the soot deposit body, and the horizontal axes represent time from left to right, where each partition is approximately 2.4 seconds. Furthermore, the same result was achieved when providing activated carbon to the catalyst chamber.

COMPARATIVE EXAMPLE 1

The supply of hydrogen to the VAD apparatus was switched from hydrogen produced at a normal temperature to hydrogen obtained by vaporizing liquid hydrogen and returning the vaporized hydrogen to a normal temperature, in the same manner as the First Embodiment, but the catalyst chamber was left empty so that the catalytic reaction did not occur. The hydrogen in this state had a parahydrogen concentration of 37%, which is higher than that of normal hydrogen. As a result, the actual flow rate of the hydrogen differed before and after the switching and the lifting speed increased by 2%, as shown in FIG. 7B. This change in the lifting speed corresponds to the amount of change when the flow rate of the hydrogen drops by about 1%. The optical fiber preform formed by changing the resulting soot deposit body into transparent glass was unusable because, due to the above difference, there was a change in the refractive index distribution and the core diameter. Furthermore, in a portion of the apparatus, the soot deposition body cracked. This cracking is believed to have occurred due to the actual flow rate of the hydrogen changing rapidly at the time of the switching, which caused the density to change quickly.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, by using the embodiments of the present invention, the flow amount of hydrogen does not change when the hydrogen supply switches from hydrogen produced at a normal temperature to a backup supply of liquid hydrogen. As a result, the equipment using hydrogen can continue to receive a stable hydrogen supply. The present invention is particularly effective when the supply is controlled by a device, such as an MFC, that performs a measurement based on the heat capacity of the hydrogen gas. This effect is extremely beneficial in the manufacturing of optical fiber preforms, which uses a large amount of hydrogen, and can also be applied on a small scale to vaporize and supply hydrogen stored in a cylinder in a liquid state to serve as a fuel cell using hydrogen as the fuel.

What is claimed is:

1. Hydrogen supply equipment comprising:
    a first hydrogen supply section operable to supply hydrogen produced at the normal temperature or hydrogen stored at the normal temperature;
    a second hydrogen supply section operable to vaporize liquid hydrogen and supply the vaporized hydrogen; and
    a hydrogen supply source switching section operable to switch a hydrogen supply source between the first hydrogen supply section and the second hydrogen supply section, wherein
    the second hydrogen supply section includes:
        a vaporizer operable to vaporize liquid hydrogen; and
        an equipment operable to accelerate a conversion from parahydrogen to orthohydrogen to obtain normal hydrogen.

2. The hydrogen supply equipment according to claim 1, wherein
the equipment operable to accelerate the conversion to orthohydrogen uses activated carbon as a catalyst.

3. The hydrogen supply equipment according to claim 1, wherein
the equipment operable to accelerate the conversion to orthohydrogen uses, as a catalyst, an object including magnetic particles.

4. The hydrogen supply equipment according to claim 3, wherein
the object including magnetic particles is sintered metal.

5. The hydrogen supply equipment according to claim 1, wherein
the equipment operable to accelerate the conversion to orthohydrogen is operable to have a temperature higher than the normal temperature.

6. The hydrogen supply equipment according to claim 1, wherein
an equipment using hydrogen supplied by the hydrogen supply equipment is provided with a measurement device operable to perform measurement based on heat capacity of a gas.

7. The hydrogen supply equipment according to claim 6, wherein
the measurement device is operable to measure a flow rate of the gas by measuring the heat capacity of the gas passing therethrough.

8. The hydrogen supply equipment according to claim 6, wherein
the measurement device is a mass flow controller (MFC).

9. The hydrogen supply equipment according to claim 1, wherein
the hydrogen supply source switching section includes:
a first valve disposed in a hydrogen supply line from the first hydrogen supply section; and
a second valve disposed in a hydrogen supply line from the second hydrogen supply section.

10. The hydrogen supply equipment according to claim 1, wherein
the second hydrogen supply section further includes a liquid hydrogen container.

* * * * *